United States Patent
Kernwein et al.

(10) Patent No.: US 9,403,517 B2
(45) Date of Patent: Aug. 2, 2016

(54) SYSTEM AND METHOD FOR DETERMINING AIR PROPAGATION DATA IN A BRAKING ARRANGEMENT OF A TRAIN

(75) Inventors: Jeffrey D. Kernwein, Cedar Rapids, IA (US); M. Frank Wilson, Cedar Rapids, IA (US)

(73) Assignee: Wabtec Holding Corp., Wilmerding, PA (US)

( * ) Notice: Subject to any disclaimer, the term of this patent is extended or adjusted under 35 U.S.C. 154(b) by 345 days.

(21) Appl. No.: 12/976,267

(22) Filed: Dec. 22, 2010

(65) Prior Publication Data

US 2012/0166109 A1    Jun. 28, 2012

(51) Int. Cl.
| | |
|---|---|
| *B60T 13/66* | (2006.01) |
| *B60T 17/22* | (2006.01) |
| *B61L 15/00* | (2006.01) |
| *B61L 25/02* | (2006.01) |

(52) U.S. Cl.
CPC ............ *B60T 13/665* (2013.01); *B60T 17/228* (2013.01); *B61L 15/0027* (2013.01); *B61L 15/0036* (2013.01); *B61L 25/025* (2013.01); *B61L 25/028* (2013.01); *B61L 2205/04* (2013.01)

(58) Field of Classification Search
CPC ........................... B60T 13/665; B61L 15/0027
USPC .......................................................... 702/47
See application file for complete search history.

(56) References Cited

U.S. PATENT DOCUMENTS

| | | | |
|---|---|---|---|
| 1,615,370 A | 1/1927 | Farmer | |
| 1,939,845 A | 12/1933 | Farmer | |
| 2,177,767 A | 10/1939 | Campbell | |
| 2,597,917 A | 5/1952 | Bent | |
| 3,101,219 A | 8/1963 | Herrera | |
| 3,187,642 A | 6/1965 | Cruse | |
| 3,227,053 A | 1/1966 | Spalding | |
| 3,613,515 A | 10/1971 | Swander | |
| 4,066,299 A | 1/1978 | Clements | |
| 4,582,280 A | 4/1986 | Nichols et al. | |
| 4,853,883 A | 8/1989 | Nickles et al. | |
| 4,859,000 A | 8/1989 | Deno et al. | |
| 4,946,229 A | 8/1990 | Deno et al. | |
| 5,056,873 A | 10/1991 | Deno et al. | |
| 5,374,015 A * | 12/1994 | Bezos et al. | ............... 246/169 R |
| 5,507,457 A | 4/1996 | Kull | |
| 5,563,353 A | 10/1996 | Ferri | |

(Continued)

FOREIGN PATENT DOCUMENTS

| | | |
|---|---|---|
| JP | 200237054 A | 2/2002 |
| KR | 20030019568 A | 3/2003 |

*Primary Examiner* — Manuel Rivera Vargas
(74) *Attorney, Agent, or Firm* — The Webb Law Firm

(57) ABSTRACT

A system for determining air propagation rate through a pneumatically-controlled braking arrangement of a train, the braking arrangement having a controller for adjusting air pressure of air transmitted through a brake pipe from a lead locomotive to a rear railcar, the system including: a lead device positioned on the lead locomotive and configured to associate first time data with first air pressure data sensed in the brake pipe at a first position; a rear device positioned on the rear railcar and configured to associate second time data with second air pressure data sensed in the brake pipe at a second position; and a control device configured to determine air propagation data based at least partially upon at least one of the following: first time data, first air pressure data, the first position, second time data, second air pressure data, the second position, or any combination thereof.

20 Claims, 3 Drawing Sheets

(56) References Cited

U.S. PATENT DOCUMENTS

| | | |
|---|---|---|
| 5,564,794 A | 10/1996 | Hart |
| 5,621,657 A | 4/1997 | Ferri |
| 5,638,276 A | 6/1997 | Hart |
| 5,722,311 A | 3/1998 | Pierce et al. |
| 5,844,126 A | 12/1998 | Labruyere |
| 5,963,883 A | 10/1999 | Cunkelman et al. |
| 6,029,447 A | 2/2000 | Stojic et al. |
| 6,126,247 A | 10/2000 | Paul et al. |
| 6,375,275 B1 | 4/2002 | Smith, Jr. et al. |
| 6,375,276 B1 | 4/2002 | Delaruelle |
| 6,487,488 B1 | 11/2002 | Peterson et al. |
| 6,619,138 B2 | 9/2003 | Kettle, Jr. et al. |
| 6,626,034 B2 | 9/2003 | Marra et al. |
| 7,303,053 B2 | 12/2007 | McCurdy, Jr. |
| 7,306,078 B2 | 12/2007 | Fish |
| 7,872,591 B2 | 1/2011 | Kane et al. |
| 2003/0193237 A1 | 10/2003 | Hart et al. |
| 2005/0240322 A1* | 10/2005 | Peltz et al. ............ 701/19 |
| 2006/0290199 A1 | 12/2006 | Beck et al. |
| 2007/0236078 A1 | 10/2007 | Smith et al. |
| 2009/0125170 A1 | 5/2009 | Noffsinger et al. |
| 2010/0130124 A1 | 5/2010 | Teeter et al. |

* cited by examiner

SYSTEM AND METHOD FOR DETERMINING AIR PROPAGATION DATA IN A BRAKING ARRANGEMENT OF A TRAIN

BACKGROUND OF THE INVENTION

1. Field of the Invention

The present invention relates generally to trains traversing a complex track network and the braking arrangements and systems of these trains, and in particular trains with a pneumatically-controlled braking arrangement having a controller for adjusting the air pressure of air transmitted through a brake pipe from a lead locomotive to a rear railcar in a train consist.

2. Description of the Related Art

In the railroad industry, multiple trains are traversing a complex track network during normal operations, which requires accurate and effective communication and control to ensure efficiency and safety. In order to provide control to the operator (or automated control features), trains are equipped with a braking arrangement and system that permits the safe control and braking of the train, normally through the use of a braking arrangement that is operatively connected to one or more railcars in the train consist.

In one particular embodiment, a train is equipped with a pneumatically-controlled braking arrangement, which includes a controller for adjusting air pressure of air transmitted through a brake pipe from a lead locomotive to a rear railcar. Normally, this operation is effected through the use of a brake valve (and/or brake cylinder) positioned on each railcar. In operation, the air pressure is communicated from the lead locomotive (or brake controller) through the brake pipe and each valve, such that appropriate and uniform braking occurs.

However, in order to ensure uniform and consistent braking between the railcars, the propagation time for air to travel from the lead locomotive to the end-of-train (or rear railcar) through the brake pipe should be determined. In particular, this air propagation rate is used to determine the braking performance of the train, since variations in the air propagation rate impact brake setup time at each railcar in the train (and, thus, the overall train braking performance). Further, knowing the actual air propagation rate through the train would allow for an accurate prediction of the setup times and braking force, and ultimately provides less uncertainty in stopping distance predictions.

In a typical train, a brake pipe reduction of 15 pounds per square inch (psi) propagates to the rear at a rate of approximately 350 feet per second (ft/sec). Presently, the propagation rate through the train is a constant that is chosen at a conservative value to account for extremes in temperature, pressure, humidity, and the physical configuration of each railcar. Predictive braking algorithms, such as those used in train control systems, benefit from eliminating all conservative constants, and replacing them with known, verifiable values. Accurately determining propagation rate (or delay) can lead to significant improvements in predictive braking processes.

Under normal operating conditions, the brake pipe is modulated only from the front of the train to the rear of the train via the air brake control system. Reducing the pressure in the brake pipe is a signal to the brake valves on each car for controlling braking force at each railcar. Greater levels of pressure reduction in the brake pipe indicate a call for greater braking force on each rail car through the air brake valve and brake cylinder located at each railcar. Reducing the brake pipe pressure at a "service" rate indicates that the brake valve on each railcar is to operate in a normal "service" mode. However, if the brake pipe pressure reduction exceeds the service rate, the brake valve on each car operates in the "emergency" mode, where the arrangement not only creates a braking force on the railcar where it is located, but also vents the brake pipe locally to aid in propagation of the brake pipe reduction.

Undesired emergency brake applications can occur if a brake valve enters emergency mode without an intentional trigger through the brake pipe. When an undesired emergency brake application occurs, the entire train enters the emergency braking state as the signal propagates through the brake pipe to both the front end and rear end of the train from the device that first triggered the emergency. Therefore, it is beneficial if a defective brake valve can be identified to eliminate any such "faulty" brake applications.

Various systems and arrangements have been provided to address certain deficiencies and issues that arise from the use of pneumatically-controlled braking arrangements. See, e.g., U.S. Publication Nos.: 2005/0240322 to Peltz et al.; and 2006/0290199 to Beck et al.; and U.S. Pat. Nos. 4,066,299 to Clements; 4,582,280 to Nichols et al.; 5,963,883 to Cunkelman et al.; 6,375,276 to Delaruelle; and 6,619,138 to Kettle, Jr. et al. However, there is still considerable room in the art for systems and methods for enhancing the operation of existing braking arrangements and train operations.

SUMMARY OF THE INVENTION

Generally, the present invention provides a system and method for determining air propagation data in a braking arrangement of train that addresses some or all of the deficiencies of the existing diagnostic systems. Preferably, the present invention provides a system and method for determining air propagation data in a braking arrangement of train that is effectively used in connection with a pneumatically-controlled train braking arrangement. Preferably, the present invention provides a system and method for determining air propagation data in a braking arrangement of train that allows for the accurate determination of propagation data for use in connection with determinations of a train control system, such as a predictive braking algorithm. Preferably, the present invention provides a system and method for determining air propagation data in a braking arrangement of train that can determine communication delays for further implementation in determining certain predictive braking algorithms and calculations. Preferably, the present invention provides a system and method for determining air propagation data in a braking arrangement of train that can be used in determining train length.

Accordingly, and in one preferred and non-limiting embodiment, provided is a system for determining air propagation rate through a pneumatically-controlled braking arrangement of a train, the braking arrangement having a controller for adjusting air pressure of air transmitted through a brake pipe from a lead locomotive to a rear railcar. The system includes: a lead device positioned on the lead locomotive and configured to associate first time data with first air pressure data sensed in the brake pipe at a first position; a rear device positioned on the rear railcar and configured to associate second time data with second air pressure data sensed in the brake pipe at a second position; and a control device configured to determine air propagation data based at least partially upon at least one of the following: first time data, first air pressure data, the first position, second time data, second air pressure data, the second position, or any combination thereof.

In another preferred and non-limiting embodiment, provided is a computer-implemented method for determining air propagation rate through a pneumatically-controlled braking arrangement of a train, the braking arrangement having a controller for adjusting air pressure of air transmitted through a brake pipe from a lead locomotive to a rear railcar. The method is implemented on at least one computer having a computer readable medium with program instructions thereon, which, when implemented by a processor of the least one computer, cause the processor to: receive data from a lead device positioned on the lead locomotive and associate first time data with first air pressure data sensed in the brake pipe at a first position; receive data from a rear device positioned on the rear railcar and associate second time data with second air pressure data sensed in the brake pipe at a second position; and determine air propagation data based at least partially upon at least one of the following: first time data, first air pressure data, the first position, second time data, second air pressure data, the second position, or any combination thereof.

In a further preferred and non-limiting embodiment, provided is an apparatus for determining air propagation rate through a pneumatically-controlled braking arrangement of a train, the braking arrangement having a controller for adjusting air pressure of air transmitted through a brake pipe from a lead locomotive to a rear railcar. The apparatus includes: means for associating first time data with first air pressure data sensed in the brake pipe at a first position; means for associating second time data with second air pressure data sensed in the brake pipe at a second position; and means for determining air propagation data based at least partially upon at least one of the following: first time data, first air pressure data, the first position, second time data, second air pressure data, the second position, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
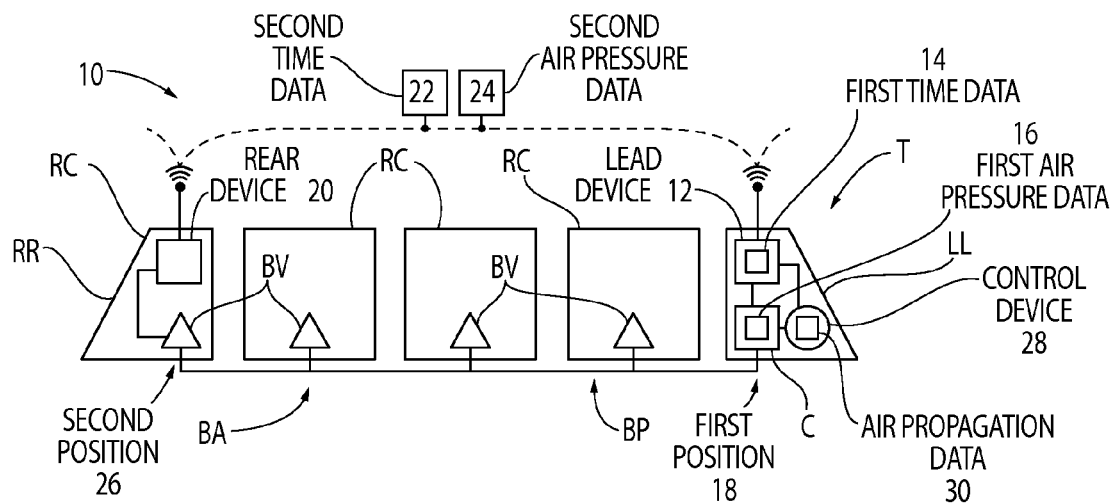
FIG. 1 is a schematic diagram of one embodiment of a system and method for determining air propagation rate in a braking arrangement of train according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to a system 10 for determining air propagation rate through a pneumatically-controlled braking arrangement BA of a train T. The braking arrangement BA includes a controller C for adjusting air pressure of air transmitted through a brake pipe BP. The brake pipe BP extends from a lead locomotive LL to a rear rail car RR. The braking arrangement BA of the train T includes the necessary components to effectively interact and brake the train T in a variety of situations and applications. Accordingly, the braking arrangement BA may include one or more brake valves BV (and/or brake cylinders), as well as the necessary reservoirs, sensors, valves, components, fixtures, and other units as are known in the art and in the railroad industry.

As discussed above, and as is known, under normal operating conditions, the brake pipe BP is modulated only from the front of the train T via the controller C of the braking arrangement BA. The reduction in pressure in the brake pipe BP is a signal to each of the brake valves BV on each rail car RC for use in controlling the braking force at each rail car RC. Further, greater levels of pressure reduction in the brake pipe BP indicate a call for a greater braking force on each rail car RC through the air brake valve BV and brake cylinder located on each rail car RC. As also discussed above, the reduction of pressure in the brake pipe BP at a service rate indicates that the brake valve BV on each rail car RC is to operate in a normal service mode; however, if the brake pipe BP pressure reduction exceeds this service rate, the brake valve BV on each rail car RC operates in the emergency mode. This emergency mode not only creates braking force on that particular rail car RC on which it is positioned, but also locally vents the brake pipe BP to aid in the propagation of pressure reduction in emergency braking of the train T.

Accordingly, the system 10 of the present invention is useful in connection with the above-described pneumatically-controlled braking arrangement BA of a train T, and is schematically illustrated in various preferred and non-limiting embodiments in FIGS. 1-5. However, it is to be understood that the present invention is equally useful in connection with a variety of pneumatically-controlled or -operated braking systems that are used in connection with vehicles, transit, and similar applications. Further, the present invention provides additional aspects and functions with respect to validating position data and determining accurate train length condition.

One preferred and non-limiting embodiment of the system 10 of the present invention is shown in FIG. 1. In particular, the system 10 includes a lead device 12 positioned on or near the lead locomotive LL (or some other forward rail car RC). This lead device 12 is programmed, adapted, or configured to associate first time data 14 with first air pressure data 16, where this first air pressure data 16 is sensed in the brake pipe BP at a first position 18. Alternatively, the first air pressure data 16 is sensed at one or more of the brake valves BV (or brake cylinders), or the controller C, in the braking arrangement BA. Regardless, the lead device 12 is utilized to associate time data, air pressure data, and position at the front of the train T, or from the position at which the pressure differential is implemented.

The system 10 further includes a rear device 20 positioned on or near the rear rail car RR. Again, while in this preferred and non-limiting embodiment the rear car RR is one preferred position for placing the rear device 20, this rear device 20 may also be positioned at various positions or places on any of the rail cars RC in the train T. Further, and as with lead device 12, the rear device 20 is programmed, adapted, or configured to associate second time data 22 with second air pressure data 24, where this second air pressure data 24 is sensed in the brake pipe BP at a second position 26. In addition, and as with the first position 18, the second position 26 can be chosen to suit the particular application, and may be the last rail car RC, or some intermediate rail car RC.

Further, and as illustrated in FIG. 1, the system 10 also includes a control device 28, and this control device 28 is programmed, adapted, or configured to determine air propagation data 30 based at least partially upon the first time data 14, the first air pressure data 16, the first position 18, the second time data 22, the second air pressure data 24, the second position 26, or any combination thereof. In one preferred and non-limiting embodiment, this air propagation data comprises the air propagation rate of air through the brake pipe BP.

Figure 2:
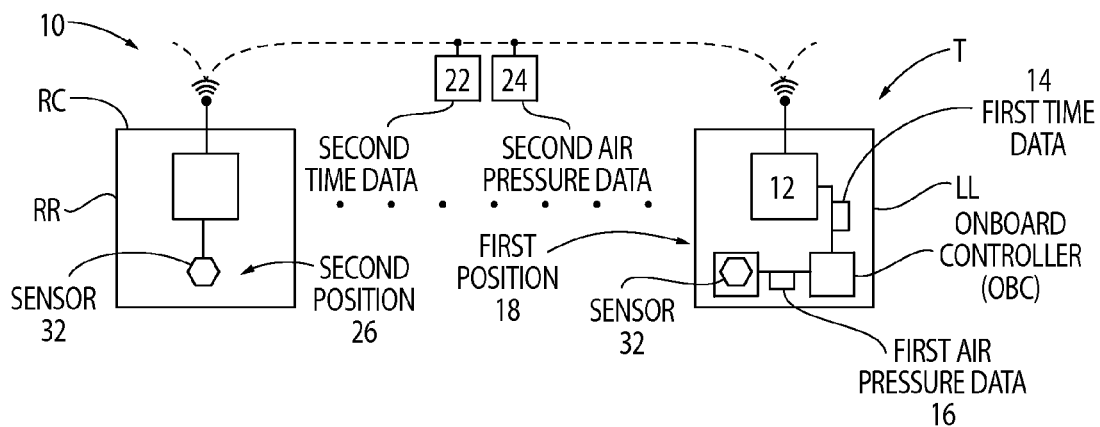
FIG. 2 is a schematic diagram of another embodiment of a system and method for determining air propagation rate in a braking arrangement of train according to the principles of the present invention.

In the preferred and non-limiting embodiment of FIG. 2, an onboard controller (OBC) is located on the lead locomotive LL. This onboard controller OBC is in communication with the lead device 12, rear device 20, control device 28, braking arrangement controller C, or any combination thereof. Alternatively, the onboard controller OBC is integrated with or takes the place of the control device 28. Accordingly, the onboard controller OBC may be provided with the first time data 14, first air pressure data 16, first position 18, second time data 22, second air pressure data 24, and/or second position 26 for use in calculating or determining the air propagation data 30, such as the air propagation rate through the brake pipe BP.

In a further embodiment, the onboard controller OBC receives the air propagation data 30 from the various components discussed above in the system 10. Next, the onboard controller OBC can use some or all of this air propagation data (or any of the first time data 14, first air pressure data 16, first position 18, second time data 22, second air pressure data 24, and/or second position 26) in order to engage in additional and further determinations and calculations. For example, the onboard controller OBC can use any of this data in determining the operation of one or more of the components of the braking arrangement BA, set up time data, braking force data, stopping distance data, predictive braking data, or any combination thereof. As discussed above, the air propagation rate can be used in the onboard predictive braking algorithms for that particular train T. Therefore, instead of using conservative or specified values, actual air propagation rate can be used in providing a more accurate predictive braking model.

As discussed, the first time data 14 is obtained from the lead device 12, and the second time data 22 is obtained from the rear device 20. In addition, the first air pressure data 16 and/or the second air pressure data 24 can be determined through the use of a sensor 32 that is in fluid communication with one or more of the components of the braking arrangement BA, such as the brake valve BV, the brake pipe BP, the brake cylinder, the controller C, or any other portion or section in the braking arrangement BA. The sensing of this air pressure data 16, 24 can be direct or indirect, and may occur at any suitable location and in connection with any component of the braking arrangement BA. Accordingly, the sensor 32 may be in the form of a pressure sensor, a fluid sensor, a flow meter, or the like.

In a further preferred and non-limiting embodiment, the lead device 12 and/or the rear device 20 may be in the form of a positioning device, a geographic information system arrangement, a global positioning system device, a timing device, a time measurement device, a satellite-communication device, or the like. For example, in one embodiment, the lead device 12 and the rear device 20 are in the form of a global positioning system receiver 34 (as seen in FIG. 2). Each global positioning system receiver 34 preferably includes serial output and is programmed, adapted, or configured to create a time mark or time stamp. It is this time stamp that is created by both the lead device 12 and the rear device 20 as part of the first time data 14 and the second time data 22.

In this preferred and non-limiting embodiment, the air propagation data 30 includes the air propagation rate which is determined by correlating pressure at both the front of the train T and the rear of the train T using the GPS receiver 34 time function, together with an accurate observation (or sensing) of change in pressure between the front of the train T and the rear of the train T. In particular, the lead device 12 could be used to set an internal clock. Similarly, the rear device 20 would also set or initiate an internal clock based upon the GPS time, and would also be programmed, adapted, or configured to record the current time when the pressure reached a specific set point. In this manner, the air propagation rate could be determined and used, as discussed above, in a variety of applications, e.g., updating braking algorithms and predictive formulae.

Figure 3:
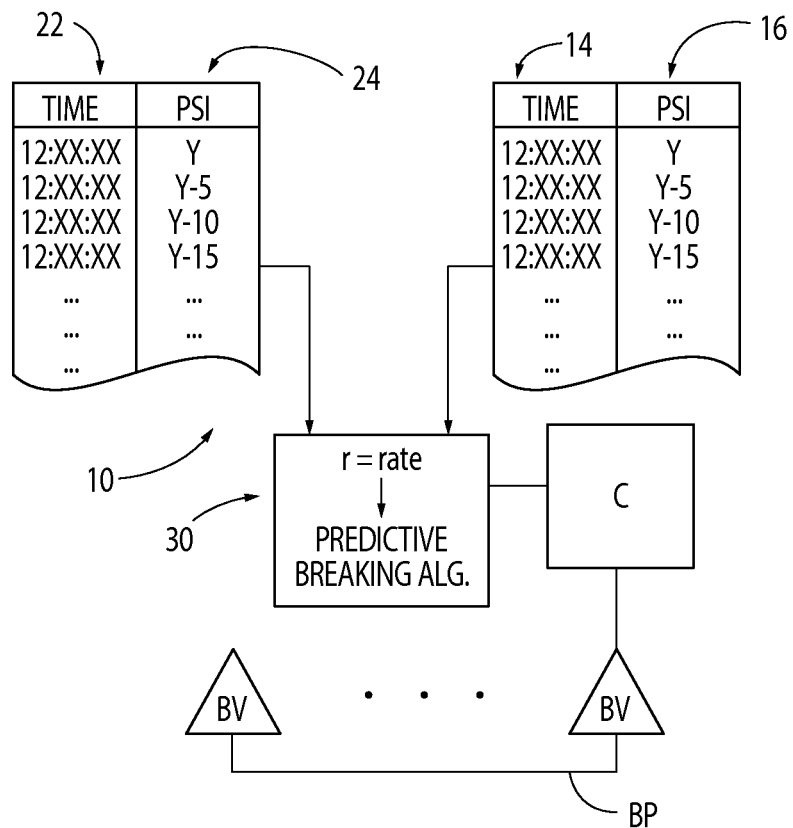
FIG. 3 is a schematic diagram of a further embodiment of a system and method for determining air propagation rate in a braking arrangement of train according to the principles of the present invention.

In a further preferred and non-limiting embodiment, and as illustrated in schematic form in FIG. 3, the first air pressure data 16 may be in the form of multiple first air pressures, and the first time data 14 would be in the form of multiple first time stamps, as set by the lead device 12. Each of these first time stamps would be associated with respective one of multiple and specified first air pressures. For example, these first air pressures may be set at a specific increment, such as between about 1 and about 10 psi. These increments, or predefined set points, would be used by the rear device 20, such that the second air pressure data 24 would include multiple second air pressures that are substantially equal to the first air pressures. Similarly, the second time data includes multiple second time stamps set by this rear device 20, and these second time stamps are associated with respective one of the second air pressures. In operation, the rear device 20 would set an internal clock (such as through the use of GPS time), and then record the current time (second time data) as pressure dropped through the same predefined set points, i.e., the corresponding first and second air pressures.

In this embodiment, the air propagation data is in the form of air propagation rate, which is determined by comparing one or more of the first time stamps with a respective one or more of the second time stamps for a respective one of the substantially equivalent sensed first and second air pressures. These increments or set points may be constants, or may be communicated between the lead device 12 and the rear device 20 in order to allow for additional flexibility in the system. Further, these set points or increments could be chosen according to the speed of the train, the need for more accurate braking information, according to a set schedule, and/or based upon when the braking algorithm was last calculated.

In a further embodiment, the first time data 14 and/or the second time data 22 could be correlated between the lead device 12 and the rear device 20, where the front-end time (first time data 14) is transmitted to the rear device 20, and a confirmation occurs through the rear-end time (second time data 22) being transmitted in a rear-to-front message. Round-trip delay could be used to estimate the calibrated time in the rear device 20, i.e., the second time data 22.

As discussed above, in certain situations, and when a brake valve BV enters "emergency" mode, it not only creates braking force on that particular rail car RC, but also vents the brake pipe BP locally to aid in propagation of the brake pipe production signal. However, undesirable emergency brake applications can occur if a brake valve BY enters this mode without some intentional trigger through the brake pipe BP. When this occurs, and as discussed above, the entire train T enters the emergency braking state, as the signal propagates through the brake pipe BP to both the front and rear from the device (brake valve BV) that first triggered the emergency. Accordingly, the present invention provides unique and innovative functionality for aiding the railroad in identifying a defective brake valve BV that was cause of the undesired emergency.

Figure 4:
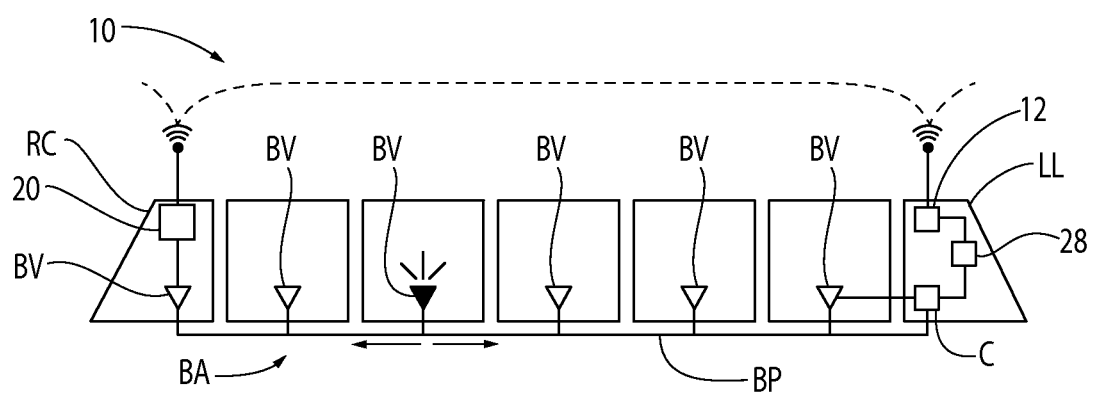
FIG. 4 is a schematic diagram of another embodiment of a system and method for determining air propagation rate in a braking arrangement of train according to the principles of the present invention.
Figure 5:
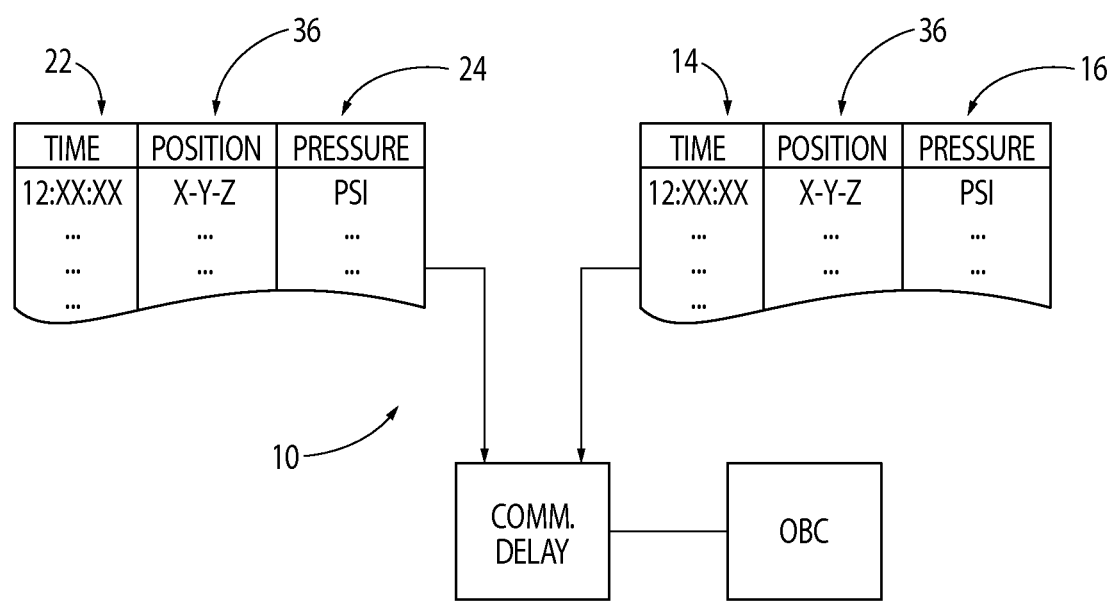
FIG. 5 is a schematic diagram of a still further embodiment of a system and method for determining air propagation rate in a braking arrangement of train according to the principles of the present invention.

In particular, and as illustrated in FIG. 4, a brake valve BV on one of the intermediate rail cars RC has failed, thus propagating this "emergency" braking signal to both the front and rear of the train T. However, when the system 10 of the present invention is implemented, first time data 14 and second time data 22 (in correlation and association with the first air pressure data 16 and second air pressure data 24) can be used to determine the likely location where the event originated, i.e., the position of the faulty brake valve BV. For example, this can occur through the use of a time stamp at a specific and given pressure between the front of the train T and rear of the train T.

In a still further preferred and non-limiting embodiment of the present invention, position data 36, such as data that is provided through a GPS system (e.g., the GPS receivers 34) is coordinated with first time data 14 and/or second time data 22, such as the GPS time stamp. This coordination and determination can be used in validating the end-of-train position information and data at any specific given time, so as to allow for accurate train length measurements by comparing the position of the front with that of the rear. Still further, delays in providing the position data 36 from the end-of-train device, such as the rear device 20, the GPS receiver 34, etc., over the radio frequency medium and into the train control system, e.g., the onboard controller OBC, may lead to uncertainty on the actual position of the end-of-train. This leads to uncertainty in the actual length of the train T. The presently-invented system 10 addresses this drawback by determining and validating the end-of-train position. In particular, the end-of-train position (or position data 36) can be validated with a time stamp to ensure the onboard controller OBC that the position information is timely, verified, and can be trusted in use for effective train control.

In this manner, the present invention provides a system 10 and method for determining air propagation data 30 in a braking arrangement BA of a train T that can be used in connection with a variety of determinations made in the train control system, such as a predictive braking algorithm. Further, the system 10 and method of the present invention can be used to determine communication delays for further implementation in determining certain predictive braking algorithms, calculations, and train position information. Further, the system 10 and method of the present invention can be used in correlating position data 36 with appropriate time data and information to verify this position information. Accordingly, the present invention provides an innovative system 10 and method that leads to more accurate information for use in a variety of control and braking train systems and sub-systems.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for determining air propagation rate through a pneumatically-controlled braking arrangement of a train, the braking arrangement having a controller for adjusting air pressure of air transmitted through a brake pipe from a lead locomotive to a rear railcar, the system comprising:

a lead device positioned on the lead locomotive and configured to associate first time data with first air pressure data sensed in the brake pipe at a first position, wherein the first air pressure data comprises a plurality of first air pressures and the first time data comprises a plurality of first time stamps set by the lead device, each of the plurality of first time stamps associated with a respective one of the plurality of first air pressures;

a rear device positioned on the rear railcar and configured to associate second time data with second air pressure data sensed in the brake pipe at a second position, wherein the second air pressure data comprises a plurality of second air pressures and the second time data comprises a plurality of second time stamps set by the rear device, each of the plurality of second time stamps associated with a respective one of a plurality of second air pressures; and a control device configured to continually or periodically determine air propagation data during normal operating conditions and based at least partially upon at least one of a sensing and an observation of a change in air pressure in the brake pipe, wherein the at least one of a sensing and an observation of a change in air pressure in the brake pipe is based at least partially upon the first air pressure data from the lead device and the second air pressure data from the rear device.

2. The system of claim 1, further comprising an onboard controller on the lead locomotive, the onboard controller in communication with at least one of the following: the lead device, the rear device, the control device, the braking arrangement controller, or any combination thereof.

3. The system of claim 2, wherein the onboard controller receives the air propagation data, the onboard controller further configured to determine at least one of the following: operation of at least one component of the braking arrangement, setup time data, braking force data, stopping distance data, predictive braking data, or any combination thereof.

4. The system of claim 1, wherein the plurality of first air pressures comprises a plurality of first air pressures set at a specific increment.

5. The system of claim 4, wherein the specific increment is between about 1 and about 10 psi.

6. The system of claim 1, wherein the plurality of second air pressures is substantially equal to the respective plurality of first air pressures.

7. The system of claim 6, wherein the air propagation data is determined by comparing at least one of the plurality of first time stamps with a respective one of the plurality of second time stamps for a respective one of the equivalent first and second air pressures.

8. The system of claim 1, wherein at least one of the lead device and the rear device comprises at least one of the following: a positioning device, a geographic information system arrangement, a global positioning system device, a timing device, a time measurement device, a satellite-communication device, or any combination thereof.

9. The system of claim 1, wherein at least one of the lead device and the rear device comprises a global positioning system receiver having serial output and configured to create a time stamp.

10. The system of claim 1, wherein the first air pressure data and the second air pressure data is at least one of determined and communicated between the lead device and the rear device.

11. The system of claim 1, wherein the rear device transmits at least a portion of second time data to the lead device at least one of the following: a set basis, a predetermined basis, a configured basis, a continual basis, a dynamic basis, a periodic basis, or any combination thereof.

12. The system of claim 1, wherein at least a portion of the first time data or at least a portion of the second time data is utilized in determining position data.

13. The system of claim 1, wherein at least a portion of the first time data or at least a portion of the second time data is utilized in determining verification data.

14. The system of claim 1, wherein the air propagation data comprises air propagation rate.

15. A computer-implemented method for determining air propagation rate through a pneumatically-controlled braking arrangement of a train, the braking arrangement having a controller for adjusting air pressure of air transmitted through a brake pipe from a lead locomotive to a rear railcar, the method implemented on at least one computer having a computer readable medium with program instructions thereon, which, when implemented by a processor of the least one computer, cause the processor to:

receive data from a lead device positioned on the lead locomotive and associate first time data with first air pressure data sensed in the brake pipe at a first position, wherein the first air pressure data comprises a plurality of first air pressures and the first time data comprises a plurality of first time stamps set by the lead device, each of the plurality of first time stamps associated with a respective one of the plurality of first air pressures;

receive data from a rear device positioned on the rear railcar and associate second time data with second air pressure data sensed in the brake pipe at a second position, wherein the second air pressure data comprises a plurality of second air pressures and the second time data comprises a plurality of second time stamps set by the rear device, each of the plurality of second time stamps associated with a respective one of a plurality of second air pressures; and determine air propagation data based at least partially upon at least one of the following: first time data, first air pressure data, the first position, second time data, second air pressure data, the second position, or any combination thereof, wherein the determination of the air propagation data occurs continuously or periodically during normal operating conditions and based upon at least one of a sensing and an observation of a change in air pressure in the brake pipe, the at least one of a sensing and an observation of a change in air pressure in the brake pipe is based at least partially upon the data from the lead device and the data from the rear device.

16. The method of claim 15, wherein the plurality of second air pressures is substantially equal to the respective plurality of first air pressures.

17. An apparatus for determining air propagation rate through a pneumatically-controlled braking arrangement of a train, the braking arrangement having a controller for adjusting air pressure of air transmitted through a brake pipe from a lead locomotive to a rear railcar, the apparatus comprising:

means for associating first time data with first air pressure data sensed in the brake pipe at a first position, wherein the first air pressure data comprises a plurality of first air pressures and the first time data comprises a plurality of first time stamps set by the lead device each of the plurality of first time stamps associated with a respective one of the plurality of first air pressures;

means for associating second time data with second air pressure data sensed in the brake pipe at a second position, wherein the second air pressure data comprises a plurality of second air pressures and the second time data comprises a plurality of second time stamps set by the rear device, each of the plurality of second time stamps associated with a respective one of a plurality of second air pressures; and means for continuously or periodically determining air propagation data during normal operating conditions and based at least partially upon a change in air pressure in the brake pipe between the first position and the second position and at least two of the following: first time data, first air pressure data, the first position, second time data, second air pressure data, the second position, or any combination thereof.

18. The apparatus of claim 17, wherein the plurality of second air pressures is substantially equal to the respective plurality of first air pressures.

19. A system for determining air propagation rate through a pneumatically-controlled braking arrangement of a train, the braking arrangement having a controller for adjusting air pressure of air transmitted through a brake pipe from a lead locomotive to a rear railcar, the system comprising:

a lead device positioned on the lead locomotive and configured to associate first time data with first air pressure data sensed in the brake pipe at a first position, wherein the first air pressure data comprises a plurality of first air pressures and the first time data comprises a plurality of first time stamps set b the lead device, each of the plurality of first time stamps associated with a respective one of the plurality of first air pressures;

a rear device positioned on the rear railcar and configured to associate second time data with second air pressure data sensed in the brake pipe at a second position, wherein the second air pressure data comprises a plurality of second air pressures and the second time data comprises a plurality of second time stamps set by the rear device, each of the plurality of second time stamps associated with a respective one of a plurality of second air pressures; and a control device configured to:

initiate the braking of the train based at least partially upon a braking model; and determine air propagation data based at least partially upon at least one of the following: first time data, first air pressure data, the first position, second time data, second air pressure data, the second position, or any combination thereof, wherein the air propagation data comprises air propagation rate, and the determined air propagation rate is used in the braking model for braking the train.

20. A system for determining air propagation rate through a pneumatically-controlled braking arrangement of a train, the braking arrangement having a controller for adjusting air pressure of air transmitted through a brake pipe from a lead locomotive to a rear railcar, the system comprising:

a lead device positioned on the lead locomotive and configured to associate first time data with first air pressure data sensed in the brake pipe at a first position, wherein the first air pressure data comprises a plurality of first air pressures and the first time data comprises a plurality of first time stamps set b the lead device, each of the plurality of first time stamps associated with a respective one of the plurality of first air pressures;

a rear device positioned on the rear railcar and configured to associate second time data with second air pressure data sensed in the brake pipe at a second position, wherein the second air pressure data comprises a plurality of second air pressures and the second time data comprises a plurality of second time stamps set by the rear device, each of the plurality of second time stamps associated with a respective one of a plurality of second air pressures; and a control device configured to:

determine air propagation data based at least partially upon at least one of the following: first time data, first air pressure data, the first position, second time data, second air pressure data, the second position, or any combination thereof; and determine a position of the rear device based at least partially on the air propagation data.

* * * * *